US012571911B2

(12) United States Patent
Schmidt et al.

(10) Patent No.: US 12,571,911 B2
(45) Date of Patent: Mar. 10, 2026

(54) SONAR METHOD FOR DETECTING AND/OR DETERMINING THE POSITION AND/OR SPEED OF OBJECTS UNDERWATER IN A SPECIFIED REGION, SONAR ASSEMBLY, AND RECEIVING UNIT

(71) Applicant: Christian-Albrechts-Universitaet zu Kiel, Kiel (DE)

(72) Inventors: Gerhard Schmidt, Moenkeberg (DE); Eckhard Quandt, Heikendorf (DE); Hanna Lewitz, Kiel (DE); Tim Owe Wisch, Kiel (DE); Bastian Kaulen, Kiel (DE); Alexej Namenas, Kiel (DE); Frederik Kuehne, Kiel (DE)

(73) Assignee: Christian—Albrechts—Universitaet Zu Kiel, Kiel (DE)

( * ) Notice: Subject to any disclaimer, the term of this patent is extended or adjusted under 35 U.S.C. 154(b) by 152 days.

(21) Appl. No.: 18/290,300

(22) PCT Filed: Mar. 13, 2022

(86) PCT No.: PCT/DE2022/100202
§ 371 (c)(1),
(2) Date: Nov. 12, 2023

(87) PCT Pub. No.: WO2022/237927
PCT Pub. Date: Nov. 17, 2022

(65) Prior Publication Data
US 2024/0241250 A1 Jul. 18, 2024

(30) Foreign Application Priority Data
May 13, 2021 (DE) ........................ 10 2021 112 535

(51) Int. Cl.
*G01S 15/00* (2020.01)
*G01S 7/536* (2006.01)
(Continued)

(52) U.S. Cl.
CPC ............ *G01S 15/003* (2013.01); *G01S 7/536* (2013.01); *G01S 15/523* (2013.01); *G01S 15/586* (2013.01)

(58) Field of Classification Search
CPC ...... G01S 15/003; G01S 7/536; G01S 15/523; G01S 15/586; G01S 15/104; G01S 15/325; G01S 15/582; G01S 15/876
See application file for complete search history.

(56) References Cited

U.S. PATENT DOCUMENTS

| | | | |
|---|---|---|---|
| 6,771,561 B2 | 8/2004 | Bouyoucos et al. | |
| 7,362,655 B1 | 4/2008 | Hester | |

(Continued)

FOREIGN PATENT DOCUMENTS

| | | | | |
|---|---|---|---|---|
| CN | 110398743 A | 11/2019 | | |
| DE | 102021112535 B3 * | 4/2022 | ........... | G01S 15/586 |

(Continued)

OTHER PUBLICATIONS

International Search Report issued on Jun. 20, 2022, in International Application No. PCT/DE2022/100202.

*Primary Examiner* — Daniel Pihulic
(74) *Attorney, Agent, or Firm* — Patent Central, LLC; Stephan A. Pendorf

(57) ABSTRACT

A sonar method and assembly for detecting and/or determining the position and/or speed of objects underwater and/or on the water in a specified region. The orthogonality of Doppler-shifted transmission sequences is explored. First, a transmission sequence is generated, spread for some possible Doppler shifts and output via the transmission elements. If the transmission sequence is chosen carefully, the spread versions become orthogonal to each other and enable MIMO signal processing. If one of the assumed spreads matches the speed of the object, the spread is canceled out again to form the original transmission signal.

(Continued)

☒ Transmitter
☒ Receiver
○ Target
/ Land area

This allows the binary detection of the presence of an object with the correlation of only one sequence and reduces the computing effort at the respective receivers enormously.

11 Claims, 1 Drawing Sheet

(51) Int. Cl.
  *G01S 15/52*  (2006.01)
  *G01S 15/58*  (2006.01)

(56) References Cited

U.S. PATENT DOCUMENTS

| | | | |
|---|---|---|---|
| 10,379,218 B1 * | 8/2019 | Spiesberger | ............ G01S 15/58 |
| 2006/0109745 A1 | 5/2006 | Bouyoucos et al. | |
| 2020/0256986 A1 * | 8/2020 | Steenstrup | ............ G01S 15/582 |
| 2024/0241250 A1 * | 7/2024 | Schmidt | ................ G01S 15/586 |

FOREIGN PATENT DOCUMENTS

| | | | | |
|---|---|---|---|---|
| WO | 2014131894 A2 | 11/2016 | | |
| WO | WO-2022237927 A1 * | 11/2022 | ............ | G01S 15/582 |

* cited by examiner

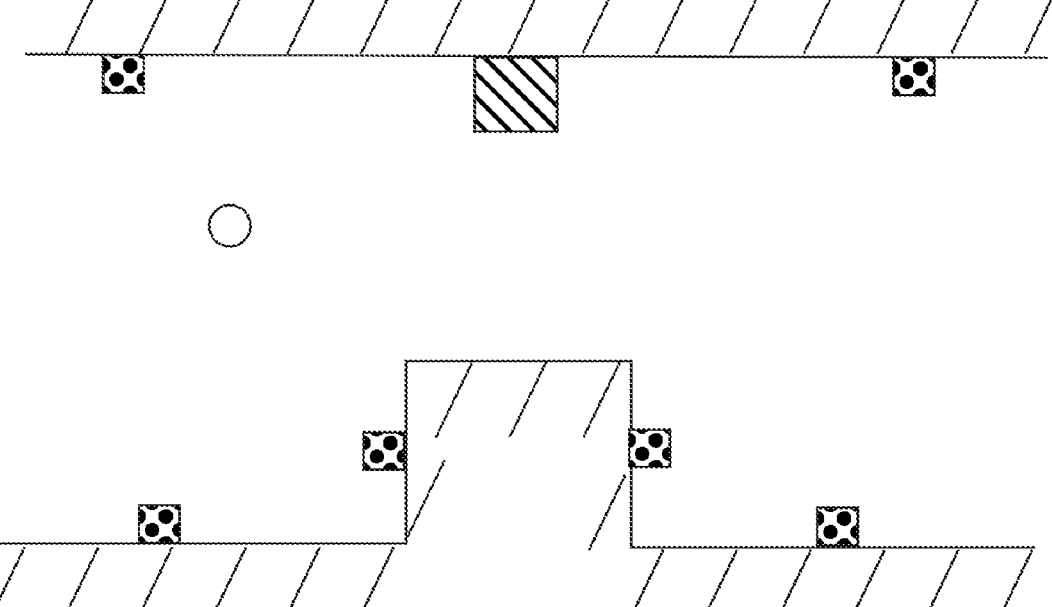
☷ Transmitter
◩ Receiver
◯ Target
╱ Land area

SONAR METHOD FOR DETECTING AND/OR DETERMINING THE POSITION AND/OR SPEED OF OBJECTS UNDERWATER IN A SPECIFIED REGION, SONAR ASSEMBLY, AND RECEIVING UNIT

The invention relates to a sonar method for detecting and/or determining the position and/or speed of objects underwater and/or on the water in a specified region. Furthermore, the invention relates to a sonar arrangement for detecting and/or determining the position and/or speed of objects on the water or underwater in a specified region and to a sonar receiving unit.

The disclosed system or method can monitor a previously defined area, in particular a sea, river or harbor area, using SONAR (Sound Navigation and Ranging). Such areas can be in particular harbors, individual ships, yachts, wind farms, locks, critical areas and infrastructures for terror defense, such as seaports and restricted military areas, water areas with cooling water intakes for industrial plants and power stations, border areas between states.

The known state of the art of a sonar system or sonar method is described below.

A SONAR system consists of transmitters (projectors) and receivers (hydrophones). In traditional systems, a single transmitter element is often operated, which transmits a sequence omnidirectionally. This signal propagates in all directions of the area to be monitored and is reflected by objects. These reflections can then be picked up by distributed receivers. With the knowledge of the transmitted signal, the position of the transmitter and receiver and the time of the start of transmission, the distance of the object can be deduced by means of a correlation. In order to calculate the angle of the object relative to the receiver in addition to the distance, the receiver must consist of more than one element. If this is the case, receiver beamforming can be carried out and the position of the object can be calculated in addition to the distance.

The (radial) speed of the object is determined via the Doppler shift of the transmission sequence. To do this, the transmitted signal must be suitably compressed or spread and then the received signal correlated with this new sequence. The signal processing of the points mentioned above must take place in real time and continuously, as an object could approach at any time.

Traditionally, continuous wave, or CW for short, and chirp sequences, i.e. sinusoidal signals whose frequency changes over time, are used in SONAR systems. Under certain conditions, chirp sequences are Doppler invariant with good autocorrelation properties, so that an exact resolution of the distance is possible. Doppler shifts can be easily detected in CW signals, so that a good estimate of the speed can be made.

Traditionally, the cost increases with the number of elements, whether in the transmitter or the receiver. This leads to expensive, complex and high-maintenance classical systems, as they consist of only one transmitter with one element and many expensive distributed receivers with several elements.

U.S. Pat. No. 6,771,561 B2 describes a sonar method in which a broadband sound source is used as the transmitter and, on the receiver side, several filters are first used to determine in which sub-bands of the broad transmission frequency band information about a target is to be sought, whereby this is intended to simplify the subsequent processing, but requires the continuous and simultaneous calculation of all filters, in particular before the reflected ping arrives, and in addition the transmission signal is not clearly coded and is orthogonal in pairs.

Furthermore, the transmission of so-called frequency hopping linear frequency modulation sequences (FH-LFM sequences) and the utilization of the orthogonal properties of these signal sequences by means of signal-adapted filtering of the respective subsequences are known from publication CN 110 398 743 A. An FH-LFM sequence consisting of several LFM sequences is composed one after the other in time, whereby these are all in different frequency ranges and the subsequences have a certain orthogonality due to their separation in the frequency range. If this FH-LFM sequence has the length of a ping, it can be transmitted continuously and signal-matched filtering can still take place due to the orthogonal properties of the subsequences. In addition, the original LFM subsequences can be Doppler-shifted so that they match any Doppler velocities of potential targets.

The U.S. Pat. No. 7,362,655 B1 discloses an acoustic underwater ranging system for determining a distance to a target object. An acoustic receiver is provided to detect acoustic energy and determine an angle of arrival of the acoustic energy in at least one plane. An acoustic transmitter emits an acoustic energy pulse. A receiver clock is connected to the receiver, and a transmitter clock is connected to the transmitter. The acoustic energy is transmitted at a synchronized time. The distance can be calculated based on the transmission time, the reception time and the reception angle. The system may also include a device for synchronizing the clocks.

A system for tracking the distance of a moving object is also known from WO 2014/131 894 A2, wherein the system comprises the following: at least two spaced apart broadband ultrasonic transmitters, each of the transmitters having a rigidly fixed and known position relative to each other; a first control component connected to each of the transmitters and arranged to cause the transmitters to periodically emit an ultrasonic burst at respective separate frequencies; a broadband ultrasonic receiver; a second control component operatively connected to the ultrasonic receiver to receive ultrasonic signals from the transmitters; the second control component comprising, for each velocity within a range of velocities, a synthesized version of each ultrasonic burst at a given frequency as would be expected to be received at the receiver when the object is moving at said velocity relative to a transmitter; wherein the second control component is operable to periodically, for each transmitter, cross-correlate a received ultrasonic signal with respective synthesized versions of ultrasonic bursts expected to be received directly by the ultrasonic receiver within a given time period after transmission by the transmitter; selecting a synthesized version having a highest cross-correlation peak as the version most closely corresponding to the velocity of the moving object; selecting a time delay of a cross-correlation peak for the selected synthesized version as an indicator of a flight time of the transmitted shock between the transmitter and the moving object; and calculating a distance between the moving object and the transmitter based on the time delay; and calculating a position of the moving object relative to the positions of the transmitters according to the ranges calculated for each transmitter.

Furthermore, it is known in the prior art that a MIMO sonar uses multiple orthogonal signals transmitted simultaneously so that they can still be distinguished at each receiver by means of filtering. The orthogonal signals do not allow beamforming on the transmitter side, but are transmitted omnidirectionally. However, the receivers can subsequently calculate beamforming on the transmitter side using the transit time differences of the separated signals, whereby it is particularly advantageous if the distance between the individual sound generators is quite large. The publication by Claussen and Zindel, "Multiple-Input-Multiple-Output (MIMO) High-Resolution Monostatic Sonar for Target Detection", conference paper, Undersea Defence Technology, Stockholm, 13 May-19 May 2019, describes a MIMO sonar with multiple receivers and improved resolution through receiver-side transmit beamforming.

It is also known to incorporate Doppler shifts into the transmitted signal in active sonar systems. For example, "Doppler hypotheses" are coded into the transmitted signal, i.e., frequency modulations for assumed speeds of a target, which are compensated for by reflection at the target.

Another example is "Own Doppler Nullifying" (ODN), with which a moving ship compensates for its known own speed when transmitting a sonar ping depending on the angle of radiation relative to the direction of travel.

Considering the immense importance of seaports for a nation's economy and the increasing need for security against terrorist acts or sabotage, the market potential arises from securing the German seaports on the North Sea with the highest turnover, namely the ports of Hamburg, Bremerhaven, Wilhelmshaven, Bremen, Brunsbüttel, Butzfleth, Emden and on the Baltic Sea the ports of Rostock, Lübeck, Puttgarden/Fehmarn, Wismar, Kiel and Sassnitz. In addition, waterways such as the Kiel Canal and the associated lock facilities are of immense importance, as these are also worthy of protection. To illustrate the market potential of the present disclosure, the most important German seaport for cargo handling is Hamburg, for example, with a handling volume of 117.2 million tons, followed by Bremerhaven 47.6 million tons, Wilhelmshaven 23.1 million tons, Rostock 19.9 million tons and Lübeck 16.0 million tons. It is clear that the transportation of goods by sea is a lifeline of the German economy, which highlights the economic importance of the seaports. Germany handles around 60 percent of its exports by sea and, as a country with few raw materials, receives almost 100 percent of the raw materials it needs via sea transportation. Any disruption to these processes results in massive economic losses. For this reason, seaports are infrastructures that need to be well secured.

While airports are subject to strict security controls and port facilities over water have at least limited access controls, the route for divers is virtually unrestricted. Camera systems are not in a position to detect or even avert any threats, as visibility under water is considerably restricted and other detection options can be outwitted by new types of systems. From the inventors' point of view, this opens up the possibility of active detection using SONAR.

Many technologies come from the military environment and are used more for the protection of individual ships, e.g., Atlas Cerberus for diver detection to protect warships. There is also a trend towards using AUVs for harbor protection. The disadvantages here are the limited travel time, the risk of collision in a busy port and the higher cost of deployment.

The problems in the state of the art are essentially the high costs and the problem of the high complexity of the many elements on the receiving end.

The present invention is based on the aim of disclosing a sonar method for detecting and/or determining the position and/or speed of objects underwater or on the water in a specified region and, furthermore, an associated sonar arrangement and receiving unit, which permit cost-effective and extremely complex economic evaluation while enabling reliable detection of objects on the water or underwater.

This task is solved with a sonar method according to the primary claim and a sonar arrangement and receiver unit according to the subsidiary claims.

In accordance with the invention, the sonar method for detecting and/or determining the position and/or speed of objects underwater and/or on the water in a specified region, comprising a sonar transmitting device which is rigidly installed and fixed at a defined position in the specified region and which can transmit a plurality of acoustic signals from sound generators that are distributed in a defined manner;

a sonar receiving unit which is provided in the specified region and which comprises a passive receiver with a hydrophone;

wherein orthogonal signals or orthogonal pings are generated and transmitted by spreading and/or compressing a selected signal sequence or a selected base signal by means of the sonar transmitting device;

the signal resulting from the reflection of the transmitted signal or ping on one or more objects is received and detected by means of a individual hydrophone of the sonar receiving unit;

and the presence or existence of an object and/or the directions from which the reflected signals originate and/or the position of all reflecting objects and/or the radial speed components of said objects with respect to the transmitter position is determined.

In a preferred embodiment, the orthogonality can be generated in particular by temporal spreading or stretching of a base transmission signal.

In a preferred embodiment, the determination can be carried out in particular with the assistance of a ring buffer and a database with previously known and/or predeterminable digital correlators or matched filters, the correlators being selected to identify the signal sequence or the base signal and its orthogonal signals or orthogonal pings compressed and stretched by the transmitter.

Furthermore, the correlator can be used to calculate a substantially non-zero overlap with the incoming signal, whereby a reflective object can be recognized.

In particular, the signal propagation time from the transmitter to the receiver can be determined by comparing the output of the digital correlator or matched filter with an adaptive threshold and the speed of the object can be determined by a cascade of correlations of the described time section, all of which calculate the spread/compressed transmitted signals.

The speed of the object can be determined by a cascade of correlations of the time section described in 1. which all calculate the spread/compressed transmission signals.

By spreading and/or compressing one or more specially selected signal sequences, orthogonal signals are generated and transmitted. The coupling of the orthogonality and spreading/compression properties is one, or even the special feature of the method. The speed-induced Doppler shift of the object reverses this. By correlating just one sequence, the presence of an object at any angle and speed at a specific time section can be determined with just a single filtering. If a correlation is decisive, the Doppler shift and thus the speed can be determined.

However, this only needs to be done with a small part of the received signal.

Furthermore, the angle of the object can be determined with a known time segment and speed by adapting the original transmission signals to the Doppler shift using classic MIMO beamforming. Since both the time segment and speed are known, the original transmission signals can be optimally adapted to the Doppler shift, classic MIMO beamforming can be performed and the angle of the object can be determined.

Furthermore, after detecting an object, all correlators can be used to identify all signals in the time window of arrival and to infer the radial speed of the object with respect to the receiver, and subsequently a Doppler compensation can be performed for all correlators with the speed found, and furthermore a further time measurement of the arrival of all signals can be performed, whereby the transit time differences determined in this way are assigned to the known spatial arrangement of the sound generators, whereby the direction in which the object must be located is determined, whereby the object can be determined on an ellipse as a further criterion, whereby its focal points are determined by the center of the transmitting station and the location of the receiver, and furthermore the direction of the object can be calculated from the point of view of the receiver.

In particular, the method or arrangement is preferably characterized by one or more features from the following list:

the receiver can be designed with low-cost and low-power hardware;

and/or the receiver can and should or does not have to communicate with other receivers or the transmitting station; an exception to this is the reception of a changed base signal or signal sequence, e.g. in the event of a daily change or similar;

and/or the objects are tracked and/or detected at the location of the receiver;

and/or the receiver operates completely passively and cannot be targeted;

and/or the receiver can be positioned at any location within the range of the transmitter station.

The method can be carried out simultaneously by several users using their own passive receivers. It is not necessary to coordinate the receivers or even couple them.

The sonar assembly for detecting and/or determining the position and/or speed of objects on the water or underwater in a specified region, may in particular comprise a sonar transmitting unit rigidly installed and fixed at a defined position in the specified region, which can transmit a plurality of acoustic signals from sound generators arranged in a rigidly distributed manner;

a sonar receiving unit with a passive receiver with a hydrophone within the specified region, wherein the sonar arrangement is designed to carry out the method according to one of the preceding claims on the sonar receiving unit and the sonar transmitting device.

The sonar receiving unit designed to operate in a sonar assembly, can in particularly have a passive receiver and a computing and evaluation unit connected thereto designed to carry out the sonar method according to one of the preceding method claims and a virtualization unit and/or visualization unit, wherein the information about the sonar transmitting device rigidly installed and fixed at a defined position in the specified region and information about the base signal are stored.

To enlarge the specified region, supplementary passive receivers can be arranged in an enlarged specified region in order to enlarge the specified region and they are connected or can be connected to the computing and evaluation unit, so that a large or larger region can also preferably be monitored from a central location. The receivers in the specified region must, of course, be within receiving distance of at least some of the transmitters in the transmitter arrangement. Specific forms of the method and arrangement are described below, which are not necessarily restrictive for the area of protection:

MIMO processing allows the complexity of the hardware to be shifted from the receiver to the transmitter. A central transmitter is required, which consists of several elements that all transmit orthogonal sequences. Due to the orthogonality, transmit beamforming can be performed on the receiver side, even if the receiver consists of only a single element.

The angular resolution depends on the number of orthogonal MIMO signals. This also means that the expansion of the individual transmitter leads to an improvement in angular resolution at all receivers.

A fundamental innovation of the innovation disclosed here is the idea of exploiting the orthogonality of Doppler-shifted transmission sequences. First, a transmission sequence is generated, spread for some possible Doppler shifts and output via the transmission elements. If the transmission sequence is chosen carefully, the spread versions become orthogonal to each other and enable MIMO signal processing. If one of the assumed spreads matches the speed of the object, the spread is canceled out again to form the original transmission signal. This allows the binary detection of the presence of an object with the correlation of only one sequence and reduces the computing effort at the respective receivers enormously.

Once it has been detected that an object is present, MIMO processing can be carried out on the basis of the extracted time period. This allows the distance, angle and speed of objects to be calculated at each individual receiving unit.

A fundamental difference between the method or system disclosed here and conventional systems is the use of multiple-input/multiple-output (MIMO) processing.

A further advantage of the present disclosure can be seen in the fact that instead of a continuous complex MIMO processing of the data in real time, only a correlation of the original transmission signal has to be calculated in real time. The complex MIMO processing can then be carried out on detection with a significantly reduced section of the received signals, which also does not necessarily have to be real-time capable. This allows the use of significantly more cost-effective computing units at the receivers.

Reducing the number of elements at the receiver cuts costs, which in turn makes the overall system extremely flexible and future-proof. If, for example, the region to be monitored were to expand, inexpensive receivers could easily be added.

A further cost reduction can be achieved by the thin-film hydrophones currently developed by the applicant, as these are smaller, more flexible and less expensive than conventional piezoceramics, since they also have smaller physical dimensions than piezoceramics known in the prior art. This enables the use of several of these thin-film hydrophones instead of a classic element and further improves the angular resolution. Direct integration into ship hulls or port facilities is also possible, as conformal designs are possible.

The greatest economic potential is likely to be seen in securing seaports worldwide, as already mentioned at the beginning. The method or system is suitable in all scenarios that require underwater monitoring of a region. This can be the monitoring of a port or other facilities or objects worthy of protection that are vulnerable to ships, divers, AUVs and the like.

The technology allows more cost-effective surveillance and detection of near-water and underwater targets compared to traditional solutions.

Below, the invention is described in detail in a specific embodiment variant, whereby this is not necessarily to be regarded as limiting the scope of protection and the embodiments, but is intended to further explain the invention.

The sonar method for detecting and determining the position and speed of objects underwater in a specified region can have a rigidly installed sonar transmitting device as the starting point, which transmits a plurality of acoustic signals from a known arrangement of sound generators.

In particular, the emitted signals are of short duration (approx. 50 ms) and orthogonal, i.e. the integral of the product of two signals over the transmission time is approximately zero if the two signals are not identical. For this purpose, a band-limited noise signal or pseudo-randomly composed chirp sequences are preferably used as the base signal, which is temporally compressed or stretched by a different factor in each transmission channel. Wherein all frequency components of the base signal are Doppler shifted differently in each channel, whereby the interval of the Doppler shifts covers the range of realistic object speeds in the monitored region. The transmitting station transmits all transmission signals simultaneously as a ping and repeats the ping at regular intervals (a few seconds).

The invention lies in particular on the receiver side. A local receiver can obtain several important pieces of information from the received signal resulting from the reflection of the transmitted ping from one or more objects and detected by a single hydrophone: i) the directions from which the reflected signals come, ii) the positions of all reflecting objects, and iii) the radial speed components of these objects with respect to the receiver position. To do this, the receiver does not require extensive processing, but only a ring buffer and a database with predetermined digital correlators ("matched filters") in one embodiment. The correlators are selected to identify the base signal and its replicas compressed and stretched by the transmitter. If the receiver also knows the times at which a ping is sent and its own position relative to the transmitter station, it can wait for the arrival of reflex signals in specified time windows. Only one correlator needs to be active, namely that of the base signal, because one of the ping signals is Doppler-shifted by reflection from a moving or stationary object in such a way that the base signal essentially arrives at the receiver. The correlator then calculates a substantially non-zero overlap with the incoming signal and thus recognizes a reflecting object. The transit time of the signal from the transmitter to the receiver can be taken directly. Only then are all correlators used to identify all signals in the time window of arrival and to infer the radial speed of the object with respect to the receiver. All correlators are then preferably Doppler-compensated with the speed found, and a further time measurement of the arrival of all ping signals is carried out. The transit time differences determined in this way are attributed to the known spatial arrangement of the sound generators and a direction is determined in which the object—as seen from the transmitting station—must be located. At the same time, it must be located on an ellipse whose focal points are determined by the center of the transmitter station and the location of the receiving station. The total transit time of the signal has already been measured, so the ellipse is known. A direction of the object from the receiver's point of view can be calculated. The computational evaluation can be carried out directly in the receiver, possibly with a time offset, so that no powerful computer structure needs to be present in the receiver.

There can be several receivers that exchange their information, but this is not necessary for the described localization. The receiver can repeat the procedure with each additional ping from the transmitter station if it is ready to receive (it may let a few pings pass unused). It can therefore also track objects in motion.

Overall, in a particularly preferred form, this results in the possibility of analyzing a complex ping signal reflected at one or more targets using a single low-cost receiver with only a single hydrophone, whereby the receiver is able to determine bearing directions, radial speeds and positions of several targets in a short time.

The maritime sector of private yachts and marines is a further potentially economically interesting field of application for the method or system according to the invention. Since the entire system can only be used if both the position of the transmitter and the transmission sequences are known to the receiver, navies or harbor operators who have installed such a system with a central transmitter could rent the information and also the receiving hardware to third parties. The devices are only functional if they know the transmitting station and the transmitted base sequence exactly, whereby the transmitting station can be made public in general, but the base sequence can easily be changed daily, so that only temporary use would be possible until the next change. Inexpensive receivers can also be sold as standard to boat owners or rented or sold in a harbor if they want sonar warnings against approaching objects underwater or other vessels. By shifting the effort and costs away from the receivers to the transmitters, the harbor operators provide the transmitter and the receivers and/or the information about the transmitted sequences can be booked by the ship owners.

There is another market in relation to wind farms. As a rule, they are required to install SONAR transponders on offshore wind turbines. While the transponders only fulfill the function of acoustically warning submarines, the system presented could enable underwater monitoring of the entire wind farm. There are currently 24 wind farms in the North Sea and 4 wind farms in the Baltic Sea in operation.

The structure of the system can also be compared with the broadcasting principle, in which there is a central, possibly somewhat more expensive transmitter and many distributed, inexpensive receivers.

In the following, an embodiment of the invention is described with reference to the accompanying drawings in the FIGURE description, whereby these are intended to explain the invention and are not necessarily to be regarded as limiting:

FIG. 1 shows a schematic representation of an embodiment example of the sonar arrangement in a harbor facility, wherein six distributed and rigidly positioned transmitters are arranged here as an example and a receiver is provided which can detect and evaluate signals, in particular signals reflected from the target, using a hydrophone signal and thus perform detection of targets in the water.

The invention claimed is:

1. A sonar method for detecting and/or determining the position and/or speed of objects underwater and/or on the water in a specified region, comprising:

rigidly installing and fixing a sonar transmitting device at a defined position in the specified region which can transmit a plurality of acoustic signals from sound generators that are distributed in a defined manner;

providing a sonar receiving unit in the specified region and which sonar receiving unit comprises a passive receiver with a hydrophone;

generating and transmitting orthogonal signals or orthogonal pings by spreading and/or compressing a selected signal sequence or a selected base signal by means of the sonar transmitting device;

receiving and detecting the signal resulting from the reflection of the transmitted signal or ping on one or more objects by means of an individual hydrophone of the sonar receiving unit; and determining on the basis of the received and detected signal the presence or existence of an object and/or the directions from which the reflected signals originate and/or the position of all reflecting objects and/or the radial speed components of said objects with respect to the transmitter position wherein the determination is carried out using a ring buffer and a database with known and/or predeterminable digital correlators or matched filters, wherein the correlators are selected to identify the signal sequence or the base signal and its orthogonal signals compressed and stretched by the transmitter or orthogonal pings, and wherein the angle of the object is determined for a known time period and speed by adapting the original transmission signals to the Doppler shift using classic MIMO beamforming.

2. The sonar method according to claim 1, wherein the determination is carried out with the assistance of a ring buffer and a database with previously known and/or predeterminable digital correlators or matched filters, the correlators being selected to identify the signal sequence or the base signal and its orthogonal signals or orthogonal pings compressed and stretched by the transmitter.

3. The sonar method according to claim 2, wherein an overlap substantially different from zero is calculated with the incoming signal by means of the correlator, thereby recognizing a reflecting object.

4. The sonar method according to claim 3, wherein the signal propagation time from the transmitter to the receiver is determined by comparing the output of the digital correlator or matched filter with an adaptive threshold; and the speed of the object is determined by a cascade of correlations of the described time section, whereby these all calculate the spread/compressed transmission signals.

5. The sonar method according to claim 4, wherein the angle of the object is determined for a known time segment and speed by adapting the original transmission signals to the Doppler shift using classic MIMO beamforming.

6. The sonar method according to claim 4, wherein after detecting an object, all correlators are used to identify all signals in the time window of arrival and to infer the radial speed of the object with respect to the receiver, and a then a Doppler compensation is carried out for all correlators with the speed determined, and furthermore, a further time measurement of the arrival of all signals is carried out, whereby the time differences determined in this way are assigned to the spatially known arrangement of the sound generators, whereby a determination of the direction in which the object must be located is carried out, whereby as a further criterion the object can be determined on an ellipse, whereby its focal points are determined by the centre of the transmitter station and the location of the receiver, and direction of the object is calculated from the point of view of the receiver.

7. The sonar method according to claim 1, wherein the receiver is designed with low-cost and low-power hardware;

and/or the receiver does not communicate with other receivers or the transmitting station;

and/or the objects are tracked and/or detected at the location of the receiver;

and/or the receiver operates completely passively and cannot be targeted;

and/or the receiver is positioned at any location within the range of the transmitter station.

8. The sonar method according to claim 1, wherein the method is carried out simultaneously by several users using their own passive receivers.

9. A sonar assembly for detecting and/or determining the position and/or speed of objects on the water or underwater in a specified region, comprising a sonar transmitting unit rigidly installed and fixed at a defined position in the specified region, which can transmit a plurality of acoustic signals from sound generators arranged in a rigidly distributed manner;

a sonar receiving unit with a passive receiver with a hydrophone within the specified region, wherein the sonar arrangement is designed to carry out the method according to claim 1 on the sonar receiving unit and the sonar transmitting device.

10. A sonar receiving unit designed to operate in a sonar assembly according to claim 9, comprising a passive receiver and a computing and evaluation unit connected thereto designed to carry out the sonar method according to one of the preceding method claims and a virtualization unit and/or visualization unit, wherein the information about the sonar transmitting device rigidly installed and fixed at a defined position in the specified region and information about the base signal are stored.

11. The sonar receiving unit according to claim 10, wherein supplementary passive receivers are arranged in an enlarged specified region in order to enlarge the specified region and they are connected or can be connected to the computing and evaluation unit.

* * * * *